Patented May 31, 1938

2,119,105

UNITED STATES PATENT OFFICE 2,119,105

PROCESS FOR THE PURIFICATION OF SILICA

Robert Hutchinson and John Arthur Newbold, Nottingham, England

No Drawing. Application December 16, 1935, Serial No. 54,712. In Great Britain December 21, 1934

7 Claims. (Cl. 252—8)

Applications have been filed in Great Britain December 21, 1934 and May 15, 1935.

For the manufacture of glass it is desirable to use silica which is free from iron impurities. It is well known that the presence of more than .04% of such impurities in silica produces glass with a green tinge which is known in the trade as "bottle glass". In order to manufacture a good colourless glass there must be considerably less than .04% of iron impurities and if possible none at all.

The most usual form of silica for the manufacture of glass is sand. Sand sufficiently free from impurities to make a colourless glass is comparatively scarce. There are, however many deposits of sand in all parts of the world having iron impurities in greater amounts, which are of considerable commercial value to the glass manufacturer if these impurities be reduced to less than .04%.

The principal object of this invention is the purification of sands such as are commonly found which may have more than 1% of iron impurities, to the degree necessary for the production of colourless glass.

It should be understood that silica in other forms is used for glass manufacture; for example, silica rock or pebbles, or flint may be used if first crushed and ground into a finely divided state. In this specification the word "sand" is intended to cover all forms of finely divided silica.

It has previously been proposed to treat sands with a sulphuric acid solution and to remove iron impurities by subsequently washing the sand so treated; in the present invention the sand is treated with sulphuric acid.

The iron impurities in sand are chiefly ferric oxide, ferrous oxide and perhaps free iron. Now in order to obtain complete purification of the sand it is essential that these impurities should be converted into ferrous sulphate and not ferric sulphate. For ferric sulphate is unstable in sulphuric acid and tends to split into ferric oxide and oxides of sulphur. Thus a complete removal of ferric oxide is impossible so long as any ferric sulphate is present in the acid solution.

This invention is characterized in that the sand is heated in a sulphuric acid solution within a closed vessel in which no free oxygen is present in the atmosphere or dissolved in the solution. When little or no free iron is present in the sand as an impurity there is added to the acid solution a substance which either alone or in combination with sulphuric acid reduces ferric sulphate to the ferrous state. In the first instance, when free iron is present, any ferric sulphate formed is immediately reduced to the ferrous state by nascent hydrogen evolved by the action between the free iron and the acid. In the second instance when no free iron is present the ferric sulphate formed is reduced by the addition of the said substance. Since no free oxygen is present in the atmosphere within the vessel or dissolved in the solution, the ferrous sulphate cannot become oxidized to the ferric state.

The vessel is fitted with a pressure release valve and also a valve through which the sand may be introduced without letting in air within the vessel. The vessel is partially filled with a dilute solution of sulphuric acid and then boiled. In the case when free iron is present as an impurity, a small quantity of crystalline sodium carbonate or other like substance is then added. Carbon dioxide is evolved and will drive off any oxygen dissolved in the solution and present in the atmosphere within the vessel, out through the pressure release valve. When the effervescence of this reaction has nearly ceased and carbon dioxide has replaced the air previously in the vessel the sand is introduced through the valve without allowing any air to enter. The solution is then boiled for about thirty minutes, meanwhile the iron impurities are acted upon by the acid and are converted into ferrous sulphate as explained above. The vessel may now be opened and the sand washed thus removing the acid solution and with it the iron impurities.

In the alternative case when no free iron is present as an impurity substances which reduce ferric sulphate to the ferrous state, may be added. For example ferrous, stannous or chromous salts may be used. Stannous chloride is particularly suitable as besides being a reducing agent it accelerates the dissolution of iron in the acid. It should be understood however, that ferrous sulphate is not suitable in this connection for, of course, it is unable to reduce any ferric sulphate to the ferrous state without producing a corresponding quantity of the ferric salt. Other suitable substances in this connection are hydrogen sulphide and hydrogen iodide.

Alternatively when no free iron is present substances which in combination with sulphuric acid reduce ferric sulphate to the ferrous state, may be added. For example a small quantity of zinc or other metal may be added so as to liberate nascent hydrogen. Or again substances such as oxalic acid, formic acid, sodium formate or potassium ferro-cyanide, may be added which with sulphuric acid evolve carbon monoxide. Either hydrogen or carbon monoxide so evolved in the nascent form will effectively reduce any ferric sulphate formed to the ferrous state.

It should be understood that when such substances as have been mentioned which combine with sulphuric acid to evolve a gas, are added, there is no necessity for the air in the vessel to have been previously driven off by the addition of sodium carbonate or the like, since the hydrogen or carbon monoxide so formed will effect this result in just the same way as did the carbon dioxide.

The sand may be introduced into the vessel through the valve either before or after introduction of substances such as have been described.

After boiling for a period of about half an hour the vessel may be opened and the sand washed as before.

It should be understood that methods including the addition of substances such as have been mentioned are not limited to the purification of sands which have no free iron, but may be equally well used on other sands.

When the sands have been removed from the closed vessel and washed they may be washed again with a very weak alkaline solution to neutralize any trace of acid left and finally washed again with water.

To indicate the degree of purification obtained by the methods, according to the invention, it should be noted that a sand containing between .6% and .7% of iron oxides has been purified after thirty minutes' treatment so as to have only .0048% of iron oxides in one case and .003% of iron oxides in another case. Again a sand having previously .93 iron oxides was purified after one hour's treatment so as to have only .016% of iron oxides. It will be observed therefore that the process is highly suitable for the purification of sands which are initially useless to the glass manufacturer, to a state in which they may be used for the manufacture of high quality colourless glass.

What we claim is:—

1. The method of purifying sand to render it fit for the manufacture of colorless glass, comprising partially filling a closed vessel with dilute sulphuric acid, adding to said solution both said sand and a substance which is chosen from the group consisting of zinc, oxalic acid, formic acid, sodium formate, and potassium ferro-cyanide, heating said vessel until the sand has been purified, and finally washing said sand after the vessel has been opened.

2. The method of purifying sand having free iron present as an impurity comprising heating said sand in a sulphuric acid solution within a closed vessel, adding to said solution a small quantity of crystallized sodium carbonate, and finally washing said sand after the vessel has been opened.

3. The method of purifying sand comprising partially filling a closed vessel with dilute sulphuric acid, adding to said solution said sand, stannous chloride, and also a small quantity of crystallized sodium carbonate, heating said vessel, and finally washing said sand after the vessel has been opened.

4. The method of purifying sand to render it fit for the manufacture of colorless glass, comprising, partially filling a closed vessel with dilute sulphuric acid, adding to said solution both said sand and a substance which is chosen from the group consisting of zinc, oxalic acid, formic acid, sodium formate, and potassium ferro-cyanide, which substance in combination with sulphuric acid evolves a gas which reduces ferric sulphate, heating said vessel, and finally washing said sand after the vessel has been opened until the sand has been purified.

5. The method of purifying sand having free iron present as an impurity, which comprises heating said sand in a sulphuric acid solution within a closed vessel, in an atmosphere devoid of oxygen, until the iron content has been reduced to less than 0.04%, reducing any ferric sulphate formed to ferrous sulphate with a substance chosen from the group consisting of stannous chloride, nascent hydrogen, and carbon monoxide, washing the sand with water, and washing the sand with a weak alkaline solution to neutralize any trace of acid.

6. The method of purifying sand, which comprises heating, in a sulphuric acid bath in a closed vessel, the sand and a material chosen from the group consisting of zinc, oxalic acid, formic acid, sodium formate, and potassium ferro-cyanide, until the iron content has been reduced to less than 0.04%.

7. The method of purifying sand, which comprises heating the sand in a sulphuric acid bath in a closed vessel, and reducing any ferric sulphate formed to ferrous sulphate with a substance chosen from the group consisting of stannous chloride, nascent hydrogen, and carbon monoxide, until the iron content is less than 0.04%.

ROBT. HUTCHINSON.
J. A. NEWBOLD.